Stress - strain curves of warps and wefts of the products.

3,532,529
PROCESS FOR MAKING SYNTHETIC SUEDES
Hiroshi Endo, Kazuo Tokoyoda, Yoshinori Saito, and Takemi Fujiu, Tokyo-to, Japan, assignors to Suehiro Sen-I Kogyo Kabushiki Kaisha, Tokyo-to, Japan, a joint-stock company of Japan
Filed Nov. 29, 1967, Ser. No. 686,416
Claims priority, application Japan, Dec. 27, 1966, 41/85,448
Int. Cl. D04b 1/00; D06n 3/14
U.S. Cl. 117—7     3 Claims

ABSTRACT OF THE DISCLOSURE

Napped knitted fabric having particular structure, i.e. double rib stitch or modified double rib stitch structure made of hydrophilic fibers is immersed in a dilute solution of polyurethane elastomer, whose concentration is less than 10% by weight and then passed through water baths maintained at temperatures in constant ranges to cause uniform infiltration and adhesion of the elastomer.

BACKGROUND OF THE INVENTION

In recent years it has been recognized by the art that synthetic leathers have excellent characteristics that can not be found in various natural leathers and several manufacturing companies in various countries including the United States of America and Japan have already succeeded in commercializing certain types of synthetic leathers, particularly for use in manufacturing shoes. According to the disclosures of patent specifications, it seems common to use non-woven or woven cloths of synthetic fibers as the ground cloth of synthetic leather and to use as the binder or coating material a mixed polymer essentially consisting of micro-porous polyurethane elastomer incorporated with another thermoplastic synthetic resin.

We have already proposed a new and novel method of treating knitted fabrics with resins wherein knitted fabrics consisting of natural fibers, regenerated fibers, synthetic fibers or mixtures thereof, treated by a dilute solution of polyurethane elastomer, as disclosed in the Japanese patent application No. 32,221 of 1966.

The present invention relates to the improvement of the method disclosed in said patent application and contemplates to provide novel synthetic suede using a knitted fabric of particular structure as ground fabric and treating said fabric by special process.

Products according to this invention have excellent physical properties as will be shown later by various data. More particularly, they are soft and have higher expansibility balanced as clothing, elasticity, toughness, air permeability, moisture permeability and drapability than any other synthetic leathers prepared prior to this invention.

The difference between the prior art and the method of manufacturing synthetic suede according to this invention is as follows. Although there are many proposals of resin treatment, there is no publication that clarifies the relation between the knitted structure of the ground cloth and the appropriate method of resin treatment therefor as mentioned above. The synthetic suede prepared in accordance with the present invention has many excellent characteristics approximate to those of natural suede. This fact is based upon the appropriate selection of raw material fibers and structure of ground fabric made of said raw material, and resin processing suitable for said ground fabric. That is, the features of the present invention are as follows:

(1) Raw material of ground fabric is mostly hydrophilic fibers;

(2) Knit structures of ground fabric are double rib stitch or modified double rib stitch which are selected from numberless varieties of knit structure; and (3) Resin used for treatment is polyurethane elastomer of medium polymerization degree close to the raw material of "spandex." Concentration of polymer solution to be used for treatment is dilute solution of less than 10% of polymer. Ground fabric soaked in the polymer solution is coagulated by passing through the cold water bath maintained at a constant temperature, thereby the resin is penetrated in and adhered uniformly to each fiber of the ground fabric. Quantity of resin adhered can be limited at a minimum (less than 15% by weight based on that of the ground fabrics) by the above-mentioned method.

The excellent properties described above can be achieved only by the particular method of this invention which consists of three steps stated above. Besides, the above the differences between the prior art and this invention will be illustrated in detail together with the explanation of the method of this invention hereafter.

SUMMARY OF THE INVENTION

To obtain such excellent products, the following manufacturing conditions are essential.

(1) As the ground fabric, napped knitted fabrics made of hydrophilic fibers are used. Knitted structures are in the form of double rib or modified double rib structure.

(2) As the polymer, is selected pure polymer of polyurethane elastomer of medium polymerization degree close to the polymer for spandex elastic yarns.

(3) The concentration of the polymer solution should be less than 10% by weight, the viscosity thereof at a temperature of 25° C. should be less than 200 centipoises, and the weight percent of the polymer adhering to the knitted fabrics should be limited to less than 15% of the ground fabrics.

(4) The solution of the polymer is to be prepared by dissolving the polymer in a suitable solvent and then diluting the solution with a nonsolvent of polymer, for example, acetone and alcohols of the quantity sufficient to render the final solution pale white.

(5) Regarding the coagulation conditions, water is used as a coagulating agent. The fabrics soaked in the solution are to be stayed for three minutes in the first coagulation bath whose temperature is maintained at the temperature from 5 to 15° C. and then the fabrics are passed through the second bath in about two minutes while transversely stretching by about 10% of their weft width.

(6) The treated knitted fabrics are dehydrated, then subjected to a warm water treatment or softening treatment if desired, slowly dried at the temperatures below 100° C., and finally polished by means of a roller wrapped with sand paper or a sanding roller. Finally, if required the treated fabrics are subjected to light steam treatment.

DESCRIPTION OF THE FIGURES

Further, advantages and objects of the present invention will become apparent and this invention will be better understood from the following description, reference being made to the acompanying drawing. The features of novelty which characterize the invention are set forth in the claims annexed to and forming part of the specification. In the drawing.

DESCRIPTION OF THE INVENTION

Figure 1:
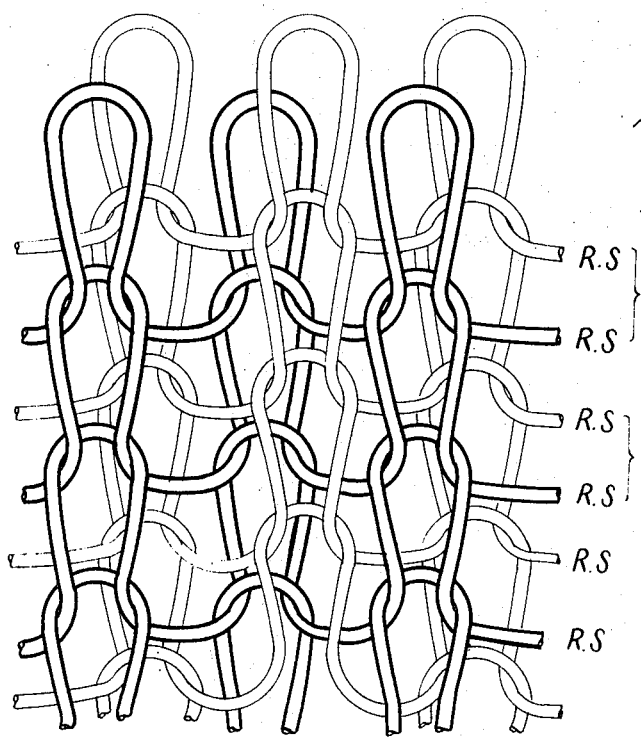
FIG. 1 is a diagram of a double rib stitch structure.
Figure 2:
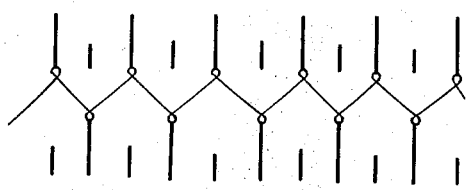
FIGS. 2 and 3 show the analyzed knitting diagrams of said structure which is two course one cycle and both sides of fabric is the same rib stitch.
Figure 3:
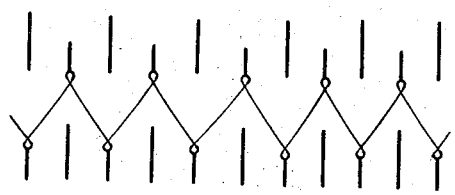
Figure 4:
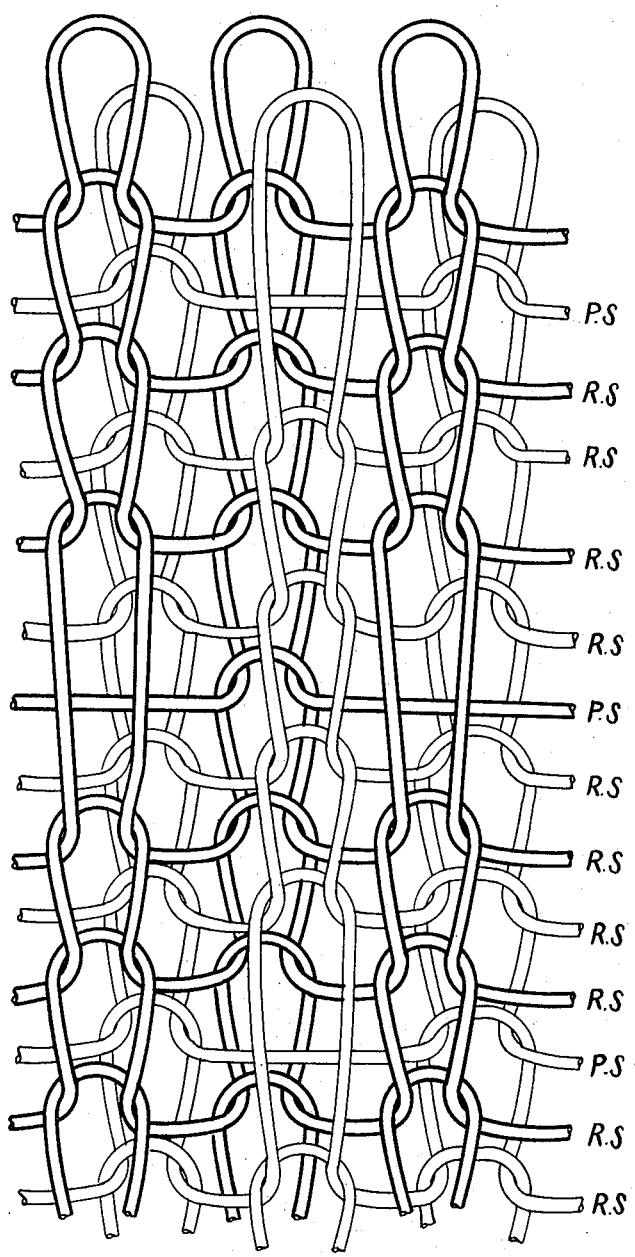
FIG. 4 is a diagram of a modified double rib stitch structure.

According to this invention, the type of raw material yarns and the knitted structure of the fabric are limited to special type and a particular method of resin treatment suitable therefor is radically different from prior arts. The products of this invention have excellent feeling and physical properties. Thus, the raw material of the ground fabric is limited to napped knitted fabrics essentially consisting of hydrophilic fibers such as cotton, wool, rayon staple fibers and the like, especially in the form of double rib or modified double rib structure. Selection of the raw material is based on the result of our extensive research and constitutes one of the essential conditions of manufacturing the novel products.

In prior methods of manufacturing of synthetic leathers, a wide variety of blanks (by the term "blank" which is herein meant not only the type of fiber but also the structure of the ground fabric) are used, but as a recent tendency, use of non-woven fabrics of synthetic fibers has increased. In addition, considerations regarding the type of fibers and the structure of the ground fabrics made therefrom have been ignored. Certain patents have merely described "knitted or woven cloths" in their specifications. Of course, blanks of wide variety may be utilized without accompanying any appreciable trouble dependent upon kinds of the products. Synthetic leathers for making shoes are examples thereof. As for kniting structure, there are numberless varieties of it, therefore, when a certain product is intended to prepare, the best structure capable of realizing the desired properties of the product must be selected from a large number of variety for knitting structure.

Besides this, it is natural that treating conditions of wide variety can be used. In the synthetic suedes according to this invention which start from knitted fabrics, starting materials are limited to hydrophilic fibers and the structure of the blank is limited to knitted structure, especially in the form of napped double rib stitch structure and napped modified double rib stitch structure, which are important features of this invention. Conditions for treatment appropriate for these blanks are greatly limited when compared with conventional art.

Grounds for selecting hydrophilic fibers are:

(1) As water is used as the coagulation agent, fibers are swollen by water during resin treatment step, thus assuring uniform penetration and diffusion of the resin solution into the micro-structure of the fibers. The impregnated resin thereafter coagulates and adheres in the micro-structure of fibers, which is advantageous to form synthetic suede of desired propetries with lesser quantity of resin, compared with the conventional methods.

(2) Napping of knitted fabrics made of hydrophilic fibers can be performed very readily and uniformly, compared with that of hydrophobic fibers.

(3) Entangle property between individual fibers is excellent. Such entangle property enables to attain the desired object with lesser amount of resin. This property is considered to be owed to their hydrophilic type and besides, twisting and rolling in cotton single fiber, crimps and scales in wool, and crimps in rayon staple fibers. Entangle property, in corporation with stitched structure of the knitted fabric, results in products of soft and attractive feeling.

On the other hand, where synthetic fibers are used as ground fabric the surface of the fiber is generally smooth and hence has less entangle property irrespective of the structure of the ground fabric. In addition, such fibers are all hydrophobic and dense in internal structure so that when solution is conducted to coagulate and adhere by utilizing plain water as the coagulation agent, the resin will adhere only on the outer surface of the fiber and it will be difficult to cause it to penetrate into the micro-structure of the fiber, thus resulting in the increase in the quantity of the resin to be used. Products utilizing synthetic fibers are not soft and of poor appearance.

(4) Owing to small quantity of resin adhered, air and moisture permeabilities of the products are improved.

As for the structure of the ground fabric, these knitted structures are characterized in that unevenness of the front surface as well as the back surface is relatively small, in other words, these surfaces are relatively flat, and that needle loops are relatively small and dense so that the knitted fabrics have a configuration close to that of woven fabrics. As a consequence, elongation in the direction of weft course is very smaller than that of other knitted structures. These are principal reasons that these particular knitted structures have been selected for this invention. When napped, structures having dense needle loops and flat cloth surface result in uniform density of naps and do not result in a remarkable decrease in the strength of the blank. Further, relatively small elongations of these knitted structures, both in the longitudinal and transverse directions, result in an improved dimensional stability of the products.

We have found that non-woven fabrics, woven fabrics and napped knitted fabrics having structures different from the particular structures specified hereinabove accompany various defects and do not provide satisfactory appearance and feeling as well as physical properties, compared with the products according to this invention. Heretofore, napped knitted fabrics were sometimes used as the starting material for manufacturing synthetic leathers but so far as we are aware there has been no attempt to use knitted fabrics of the double rib stitch structure and modified double rib stitch structure for the manufacture of synthetic suede. We have found that in a large number of knitted fabric structure, only said structures are capable of achieving the desired properties of the product. This is one of the important features of this invention.

Resin treatment suitable for these blanks will now be described in detail. As the treating resin, polyurethane elastomer is singly used without mixing any other thermoplastic synthetic resin. The resin used is a polymer of medium polymerization degree close to the raw material of urethane elastic yarns (spandex), that is a urethane polymer having a molecular weight of from 50,000 to 70,000 and a hardness of less than 82 (determined by JIS—Spring method) at 20° C., and containing prepolymer of methyl diphenyl diisocyanate (MDI), tolylen diisocyanate (TDI), or aliphatic diisocyanate. In many cases, heretofore, highly polymerized polyurethane elastomer has been used, and to adjust the hardness of the products or from the viewpoint of economy other thermoplastic synthetic resins were incorporated to polyurethane. In contrast, in this invention it is not necessary to use such additional resins. Utilization of such other resins is not desirable. Since water is used as the coagulation agent, solvents soluble to water are selected as the solvent for polyurethane such as, for example, dimethyl formamide (DMF), diethyl formamide (DEF), tearahydrofurane (THF), dimethyl sulfoxyde (DSO), diethyl dioxyde (DEO), or mixture of them. As the diluent for the solvent, acetone or alcohols are employed. More particularly diluents which are non-solvent for the polymer but soluble in its solvent and water are used. These diluents are added to a solution in which the polymer has been dissolved beforehand and the degree of dilution is adjusted to such an extent that the liquid phase become pale white. This is to make uniform the particle size of the coagulating solid phase which is formed when the polymer in the aqueous solution coagulates later. As an example, one part of the polymer is dissolved in three parts of DMF and the resulted solution is gradually diluted with six parts of acetone.

It is advantageous to adjust the concentration of the polymer (with respect to the solvent and diluent) to less than 10% by weight, and the viscosity at a temperature of 25° C. to less than 200 centipoises. It is particularly noted that this value of concentration is extremely lower than the values in prior arts.

Coagulation conditions are as follows:

As described above, water is selected as the coagulation agent and the coagulating solution is contained in two separate baths. First the blank fabric soaked in the polymer solution is passed through a first coagulation bath under no tension while vibrating it gently whereas in the second coagulation bath the fabric is passed during which it is stretched in the transverse direction to increase its wefting width by about 10% whereby to complete coagulation of the polymer and set the width of the fabric. Though the double rib stitch and modified double rib stitch structures have considerably smaller transverse elongation than other type of knitted structures, abovementioned stretching of about 10% in second bath coagulation can decrease more transverse elongation, thus not only imparting dimensional stability but also greatly improving the balance between elastic strains in the longitudinal and transverse directions. We believe such a method of cogulation is new and novel. Although it is the common practice to warm the coagulation bath, according to this invention it is preferable to cool it in order to provide satisfactory products. Thus, the best result can be obtained when the first and second coagulation baths are maintained at the same temperature of from 5° C. to 15° C. When the temperature of water is less than 5° C., the coagulation time of the polymer is prolonged so that use of such low temperatures should be avoided. Temperature higher than 15° C. increases the coagulating velocity of the polymer, but results in coarser particles of coagulated phase, so that such temperatures are not suitable.

The staying time of the fabric is about 3 minutes in the first coagulation bath and about 2 minutes in the second coagulation bath. Such a short coagulation time of the polymer constitutes one of the features of this invention. Thus, the quantity of the polymer adhering to the final treated products is less than 15% by weight, based on the weight of the ground fabrics and such relatively small quantity assures the preparing of desired products.

While foregoing description relates to conditions of treatment essential to obtain the products of this invention, and to the comparison thereof with prior techniques, details of manufacturing steps for the novel process are as follows:

Circular knittings of double rib stitch or modified double rib stitch structure made of the yarns essentially consisting of hydrophilic fibers are cut open to provide blank fabrics. These fabrics are napped on one or both sides of it to have nap length of 1 to 2 mm. The napped fabrics are immersed in a solution containing less than 10% of the polymer and maintained at room temperature, and then excess solution is removed by means of squeeze rolls, the average pick up rate being about 150%. Squeezed fabrics are then transferred to the coagulation bath to complete coagulation. The treated fabrics are then dehydrated under suction by utilizing sponge rollers or the like. When the treated fabrics are relatively hard, they are additionally passed through warm water of 60° C. to 80° C. for two to three minutes and are then subjected to dehydration under suction, and if required oiling for the fabrics are carried out.

When slowly dried in a hanging dryer or in a suction drum dryer at temperatures below 100° C., the finished products are soft and have good appearance.

Then treated fabrics are subjected to polish finishing step. Usually the first step of polishing is effected with a sand paper roll of JIS No. 100, while the second step of polishing is effected with a sand paper of JIS No. 15. However, in certain cases, these polishing steps may be effected with only the sand paper of JIS No. 150. It is advantageous to limit the degree of polishing to less than 0.2 mm. in the thickness direction of the treated fabrics when polishing only one surface, and the 0.25 mm. in total when polishing both surfaces. Where the fabrics are made of spun yarns of wool or mixed wools it is preferable to subject the polished fabrics to steam treatment.

To obtain a colored product, it is usual to dye yarns or blank fabrics by yarn dye or piece dye operation respectively and pigments of the same colour as that of the dye are dispersed in the polymer solution whereby the desired color is readily provided.

Figure 15:
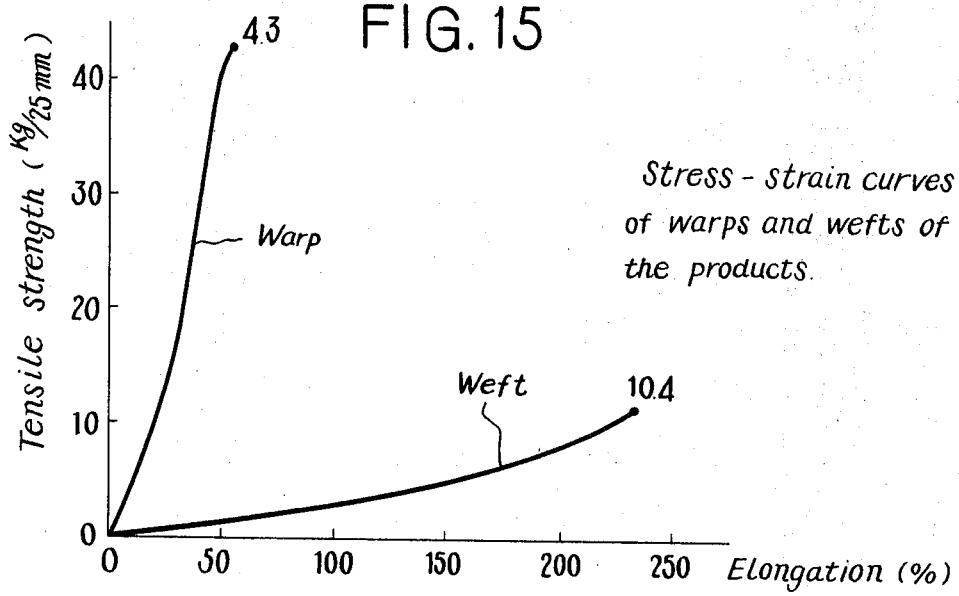
FIG. 15 shows stress-strain curves of warps and wefts of the product.

Physical properties and applications of the products of this invention are as follows:

Table 1 below shows measured values of physical properties of samples prepared in accordance with the novel process while FIG. 15 shows stress-strain curves of the same samples measured at temperatures of 20±0.5° C. and at a relative humidity of 65 ± 2%.

TABLE 1

| Physical properties | Warp | Weft |
|---|---|---|
| Tensile dry strength (kg./25 mm. width) | 40.8 | 11.8 |
| Tensile dry elongation (percent) | 48.8 | 244.7 |
| Tear strength[1] (kg.) | 3.1 | 1.0 |
| Softness,[2] degree | 0.02 | 0.04 |
| Resistance to surface abrasion (number of times) | 8.5×10² | |
| Thickness (mm.) | 1.39 | |
| Weight (g./m²) | 394.1 | |
| Air permeability (sec./300 cc./cm.²) | 3.54 | |
| Moisture permeability[3] (percent) | 17.8 | |

[1] Measured by JIS, L 1005 (Tongue method).
[2] Measured by Clark method.
[3] Measured by JIS, J1079—1966.

Figure 5:
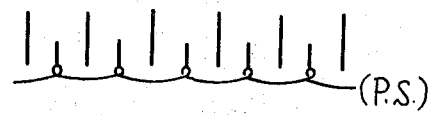
FIGS. 5 to 14 show the analyzed knitting diagrams of said structure which is ten course one cycle, and two courses shown in FIGS. 5 and 10 are knitted by plain stitch and all of other courses are done by rib stitch.
Figure 6:
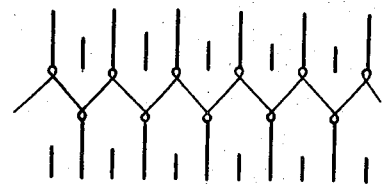
Figure 7:
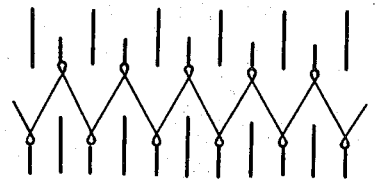
Figure 8:
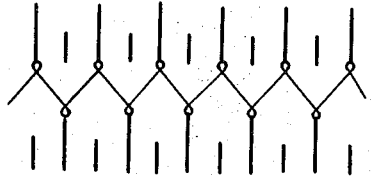
Figure 9:
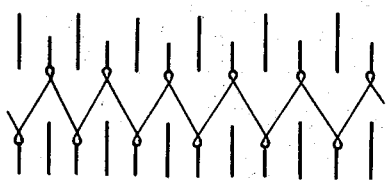
Figure 10:
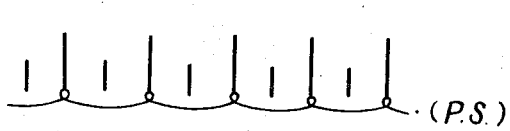
Figure 12:
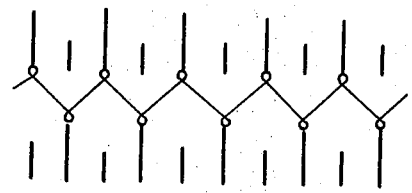
Figure 11:
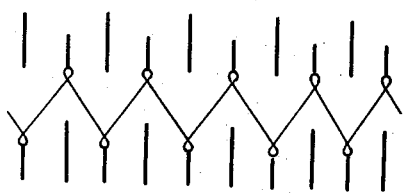
Figure 13:
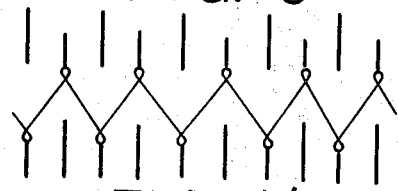
Figure 14:
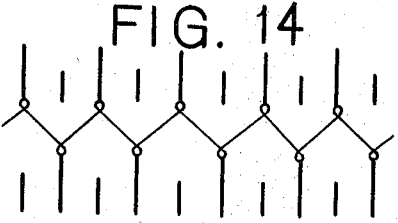

The products of this invention are soft and have wet touch feeling as well as pliability just like natural suede. As shown in Table 1, the softness degree measured by the Clark method is 0.02 to 0.04 which shows that the products of this invention are very soft. Elongations are 48% and 240% in the longitudinal (warp) and transverse (weft) direction, respectively, and these values are desirable, as compared to 5 to 25% of other conventional synthetic leathers. In addition, as shown by stress-strain curves shown in FIG. 5 resiliency of the products is excellent. Further, the mechanical strength is sufficiently high. Air permeability of 3.5 sec./300 cc./cm.² and moisture permeability of 18% are also satisfactory values, which can be proved by the fact that the moisture permeability of under wear goods made of bemberg tricot is 26%. Thus the products of this invention have superior physical properties over other synthetic leathers because of their excellent softness, extensibility, elasticity, toughness, drape characteristic, air permeability and moisture permeability.

Following specific examples are given by way of illustration, and are not to be constructed as limiting in any way the scope and spirit of the invention.

EXAMPLE 1

Raw material of ground fabric: 100% cotton, No. 30 count, single thread (cotton count)
Knitted structure:
  Gauge—No. 22, diameter—24 inches,
  Double rib structure
Machine used: Circular interlock knitting machine
Weight of knitted fabric: 300 g./m. (width—130 cm.)

After dying a pale yellow color, both surfaces of the knitted fabric were subjected to napping treatment to provide uniform density of naps having length of 1 to 3 mm., the width of the napped fabric being 110 cm.

One part of a polymer (MDI) having a molecular weight of about 50,000 and a hardness of about 75 at a temperature of 20° C. was dissolved in a solvent consisting of one part of tetrahydrofurane and two parts of dioxan. The resulted solution was diluted with six parts of non-solvent acetone to adjust the consistency of the solution to pale white.

A yellow pigment was dispersed in the solution at a rate of 1 g./liter. The viscosity of the solution at 25° C. was 100 cps. and the concentration of the polymer in the solution was 10 percent, by weight. The knitted fabric with both surfaces napped was dipped in the solution for 2 to 3 minutes at room temperature, squeezed at a ratio of 1:2 by means of squeezing rolls and then transferred to the coagulation step. The temperatures of the first and second coagulation baths were both maintained at 10±2° C. In the first coagulation bath, the fabric was passed while slightly vibrating it, the staying time in the bath being about two minutes. Then the fabric was passed through the second coagulation bath while stretching the width to 125 cm. from 110 cm. by means of tenter. Coagulation of the polymer was completed within two minutes to fix the width. Then the treated fabric was dehydrated by suction by means of sponge rolls, then passed through a bath of warm water maintained at a temperature of 80° C. for one minute, again dehydrated with sponge rolls, and dried with hot air at 85° C. supplied from a hanger drier. Both surfaces of thus obtained fabric were thoroughly polished to obtain a finished product. Its width was 120 cm., its weight was 350 g./m., and the quantity of polymer adhered was 14.3%, based on the weight of the ground fabrics. The product manifested a feeling in touch and an appearance like a natural suede, had an excellent extensibility and resiliency. The product was suitable for use as overcoats, car clothes, household glass cleaning cloths and the like.

EXAMPLE 2

Raw material:
  Acrylic fiber—50%
  Wool—50%
  No. 48 count, single thread (meter count)
Knitted structure: Same as in Example 1
Weight of knitted fabric: 370 g./m. (width—120 cm.)

Mixed yarns of Kashimilon (Japanese acrylic fiber) and wool dyed with a deep red dye were used to prepare a fabric having a knitted structure as above described. Both surfaces of the knitted fabric were napped as in example 1 to provide a fabric having naps of the length of 2 to 3 mm., a width of 100 cm. and a weight of 350 g./m.

One part of polymer (TDI) having a molecular weight of about 60,000 and a hardness of about 80 at a temperature of 20° C. was dissolved in a solvent consisting of two parts of tetrahydrofurane and one part of dioxan. The resulted solution was diluted with eight parts of methyl-ethyl-ketone (MEK) to provide a solution having a consistency of pale white. A deep red pigment was incorporated to and dispersed in the solution at a rate of 6 g./liter. The viscosity of this polymer solution was 95 cps. at a temperature of 25° C. and the concentration of the polymer in the solution was 8 percent, by weight. The knitted fabric with both surfaces napped was immersed in said solution at room temperature for 2 to 3 minutes, squeezed at a ratio of 1:1 by means of squeeze rolls, and was then transferred to the coagulation step. The coagulation step was the same as that of Example 1 except that the width of the fabric was increased to 115 cm. from 100 cm. in the second coagulation bath by means of a tenter. The product manifested an appearance and feeling in touch similar to a natural suede, had a finished width of 110 cm. and finished weight of 395 g./m. The quantity of polymer adhered was 11.4% based on the weight of the ground fabrics. This product was suitable for use as overcoats and like suits, motor-car sheets and the like.

EXAMPLE 3

Raw material:
  Wool—100%
  No. 48 count, single thread (meter count)

Knitted structure:
  Gauge—No. 22, diameter—29 inches,
  Double rib structure
Weight of knitted fabric: 400 g./m. (width—148 cm.)

After dying with a pink color dye, both surfaces of this knitted fabric were napped in the same manner as in Example 1 to form naps of 1 to 2 mm. length. The width of the napped fabric was 130 cm. and the weight thereof was 380 g./m.

The polymer used was prepared by blending methyl diphenyl diisocyanate (MDI) and tolylene diisocyanate (TDI) which were used in Examples 1 and 2 respectively, at a ratio of 1:1 and had a molecular weight of about 70,000 and a hardness of about 70 at a temperature of 20° C. One part of this mixed polymer was dissolved in three parts of dimethyl formamide (DMF) and the resulted solution was diluted with five parts of non-solvent acetone and five parts of methyl-ethyl-ketone to provide a solution having a consistency of pale white. A pink coloured pigment was dispersed in the resultant solution at a rate of 3 g./liter. This polymer solution had a viscosity of 100 cps. at a temperature of 25° C. and the concentration of the polymer in the solution was 7% by weight. The knitted fabric with both surfaces napped was dipped in this solution at room temperature for two to three minutes, then squeezed at a ratio of 1:1.5 by means of squeeze rolls and transferred to the coagulation step. In the coagulation step the width of the fabric was increased to 145 cm. from the original width of 130 cm. in the second coagulation bath by means of a tenter. After finishing the coagulation step the treated fabric was dehydrated by suction by means of sponge rolls, then passed through a bath of warm water maintained at a temperature of 90° C. and again dehydrated by a sponge roll. Other manufacturing steps were identical to those utilized in Examples 1 and 2.

The finished product had a width of 135 cm., a weight of 438 g./m. and the amount of polymer adhered was 13.2%, based on the weight of the ground fabrics.

Thus, this invention provides a novel process of manufacturing synthetic suedes of excellent physical properties at low cost. The products of this invention are suitable for making women's half coats, men's home wears, golf gloves and the like articles. Further, they have improved washability owing to the permanency of its appearance and feeling, and improved dimensional stability and toughness due to firm adhesion of resin, and therefore, the products are suitable for making car polishing cloths and glass polishing cloths for use in homes.

What is claimed is:

1. A process of manufacturing synthetic suedes comprising the steps of selecting a napped knitted fabric of double rib stitch or modified double rib stitch structure made of spun yarns essentially consisting of hydrophilic fibers; preparing a solution by uniformly dissolving in a solvent a urethane elastomer having a molecular weight ranging from 50,000 to 70,000 and a hardness of less than 82; diluting the resulting solutiton by a non-solvent to obtain a pale white solution having a polymer concentration of less than 10%, by weight, and a viscosity of less than 200 centipoises at 25° C.; immersing said napped fabric in said diluted solutiton at room temperature; dehydrating the immersed fabric by means of squeeze rolls; passing said fabric under no tension for about three minutes through a first coagulation liquid consisting of water maintained at a temperature ranging from 5° C. to 15° C., thus causing coagulation of said elastomer; then passing said fabric under transverse tension for about two minutes through a second coagulation liquid of the same temperature as said first coagulation liquid whereby to stretch said knitted fabric in the transverse direction by about 10% of the wefting width thereof and to complete coagulatiton of the polymer as well as setting of wefting width; dehydrating the thus treated napped knitted fabric; gradually drying the fabric at temperatures below 100° C.; and polishing said dried treated fabric.

2. The process of manufacturing synthetic suedes according to claim 1 whereien said hydrophilic fiber comprises a member selected from the group consisting of cotton, wool, viscose staple fiber, synthetic fiber and mixtures thereof.

3. The process of manufacturing synthetic suedes according to claim 1 wherein the final product contains less than 15%, by weight, based on the weight of the ground fabrics, of said polymer.

References Cited

UNITED STATES PATENTS

| | | | |
|---|---|---|---|
| 3,284,274 | 11/1966 | Hulslander et al. | 161—159 |
| 3,399,102 | 8/1968 | Matsushita et al. | 161—67 XR |

ROBERT F. BURNETT, Primary Examiner

W. A. POWELL, Assistant Examiner

U.S. Cl. X.R.

117—62.2, 64, 135.5, 138.8, 145, 161; 161—67, 89